United States Patent [19]
Wulf

[11] 3,842,460
[45] Oct. 22, 1974

[54] HYDRAULIC WINDSHIELD WIPER ACTUATING MECHANISM

[76] Inventor: Hurst E. J. Wulf, 625 Middlesex, Grosse Pointe Park, Mich. 48230

[22] Filed: Mar. 27, 1972

[21] Appl. No.: 238,155

[52] U.S. Cl.............................. 15/250.27, 15/250.3
[51] Int. Cl.............................. B60s 1/12, B60s 1/28
[58] Field of Search......... 15/250.3, 250.16, 250.27; 91/7; 60/571, 572, 573

[56] References Cited
UNITED STATES PATENTS
1,510,015 9/1924 Rayfield.......................... 15/250.3 X
2,370,376 2/1945 Snell............................ 15/250.16 X
FOREIGN PATENTS OR APPLICATIONS
473,603 5/1951 Canada............................ 15/250.3

Primary Examiner—Peter Feldman
Attorney, Agent, or Firm—D. Edward Dolgorukov

[57] ABSTRACT

This invention relates to an improved hydraulic windshield wiper actuating mechanism. The specification discloses an improved actuating mechanism wherein the need for a mechanical linkage between the drive motor and the wipers is eliminated and replaced with space saving hydraulic lines. This is accomplished by having a pair of opposed and interconnected reciprocating hydraulic slave cylinders placed near each wiper and adapted to drive the wiper arm in the desired fashion. The slave cylinders are activated by a pair of opposed hydraulic reciprocally operated drive cylinders driven by an electric motor. Since the motor operating the drive cylinders is connected by hydraulic lines to the slave cylinders, it may be placed in any desired location in the automobile.

12 Claims, 12 Drawing Figures

HYDRAULIC WINDSHIELD WIPER ACTUATING MECHANISM

This invention relates to a hydraulic windshield wiper actuating mechanism and more particularly to an actuating mechanism of the type which may be used on a truck or passenger automobile.

Although the present day windshield wiper and its actuating mechanism is an old device, it was developed after the passenger car. By the time the windshield wiper was invented, the main components of the automobile, such as the engine, transmission and drive train, had already assumed rather standard locations in the automobile. Thus, when the mechanically actuated windshield wiper mechanism was developed with its accompanying rather bulky linkage, there were few places available large enough in the engine compartment to accommodate it. The cowl area was chosen to accommodate the necessary linkage and the electric drive motor which runs it.

The various designs for the mechanically actuated windshield wiper variously placed the linkage either inside the passenger compartment or in a plenum chamber outside the passenger compartment and in the cowl area. The more modern designs place such linkage outside the passenger compartment. Regardless of where the linkage was, however, the electric drive motor almost invariably assumed a standarized position near the center of the cowl and protruding into the engine compartment.

While this bulky mechanism caused few problems in the older days when cars were much higher than presently and engine compartments much larger, the necessity of finding space for it in the present day when designers are constantly trying to lower the cars and make them smaller for production economy, causes many problems.

In order to lower the profile of the automobile, the cowl plenum chamber must also be made smaller. The bulky mechanical linkage of the prior art simply takes up too much space in the plenum chamber to allow it to be made smaller in any significant amount.

Also, the mechanical drive linkage cannot be assembled outside the automobile and be put into it as a unit, but all this difficult linkage must be assembled inside the cowl plenum chamber. This not only results in a difficult, costly and slow assembly operation for the production line but further physically limits the size this chamber can be reduced to by the size necessary for the worker's hands to fit inside said chamber in order to assemble the linkage.

Further design limitations are imposed on a designer by the fact that the series of rods which the drive motor must operate in order to drive the windshield wiper must be substantially straight and could not be varied in shape to fit the contours of a smaller plenum chamber. Also, as previously mentioned, with the mechanical linkages of the prior art the drive motor is almost invariably placed on the center of the fire wall protruding into the engine compartment. As the car profile is lowered, this drive motor also assumes a lower position and limits the designers by the fact that said drive motor can only be lowered so much before it starts interfering with the engine itself.

In addition to what are essentially design limitations, several other problems have arisen because of the use of the mechanical windshield wiper actuating mechanism. First, in order to get proper acceleration and deceleration of the windshield wiper arm with the present mechanical linkage, a theoretical infinite length wiper arm must be used. Since this is inherent in the mechanical system, this, in effect, means that with the present state of the art, it is impossible to obtain the theoretical ideal acceleration.

Also, the conventional mechanical wipers transmit the noise from the drive motor into the passenger compartment by way of the mechanical linkage. With today's concern for reducing noise in every possible way, this problem has come to the fore when it was not even considered important before.

Another problem which has come into prominence because of today's concern with safety is how to install economically windshield wipers to clear the rear window of the automobile. This has proved unfeasible with the conventional system due to expense and space limitations of the old system.

Accordingly, attempts have been made to solve the foregoing problems of the conventional mechanical systems. Most of these attempts revolve around replacing the conventional electric drive motor with a hydraulic motor. While this solved some of the sound problem and gave the possibility of an infinitely variable speed, it did not solve any of the design problems because the mechanical linkage was still necessary and the hydraulic motor merely went in the same place as the electric motor it replaced. In addition, a separate hydraulic pump or a power steering pump on the car was necessary to drive the hydraulic motor, which resulted in a greatly increased cost with not much benefit resulting therefrom. As can be seen, this was not a very satisfactory solution and attempts to solve this problem have continued.

Accordingly, one of the objects of the present invention is to provide an improved mechanism for operating windshield wipers whereby the aforementioned difficulties and disadvantages of the prior constructions are overcome and largely eliminated, and a much simpler windshield wiper actuating mechanism is thus produced without increasing costs, and, in fact, with a substantial reduction thereof.

A further object of the present invention is to provide a hydraulically actuated windshield wiper mechanism in which the mechanical linkage between the motor and the windshield wipers is eliminated.

A further object of the present invention is to provide a windshield wiper actuating mechanism wherein the portion of such mechanism which drives the windshield wiper itself can be assembled as a unit outside the automobile and simply attached to the cowl of the automobile as a unit, thereby eliminating a previously costly and time consuming operation.

A further object of the present invention is to provide a windshield wiper actuating mechanism wherein the drive motor may be placed in virtually any desired location in the automobile.

A further object of the invention is to provide a hydraulic windshield wiper actuating system wherein the size of the mechanism to be placed in the cowl plenum chamber is greatly reduced, thereby relieving design limitations as to the size of said cowl chamber.

A still further object of the present invention is to provide an actuating mechanism wherein the drive motor is removed from the center of the cowl, thereby no longer protruding into the engine compartment in a position where it will interfere with the automobile engine should the profile of the automobile be lowered.

A still further object of the invention is to provide a windshield wiper actuating mechanism which can be easily and relatively inexpensively installed at the rear window of the automobile in such a manner as to clear said rear window.

A further object of this invention is to eliminate any transmission of noise into the passenger compartment by the windshield wiper actuating mechanism.

A further object of the present invention is to provide an ideal acceleration and deceleration of the windshield wiper arm.

A still further object of the invention is to eliminate the need for a special hydraulic pump or power steering pump on an automobile, which pump was necessary with previous hydraulic windshield wiper systems.

Further objects and advantages of this invention will be apparent from the following description and appended claims, reference being had to the accompanying drawings forming a part of this specification, wherein like reference characters designate corresponding parts in the several views.

Figure 1:
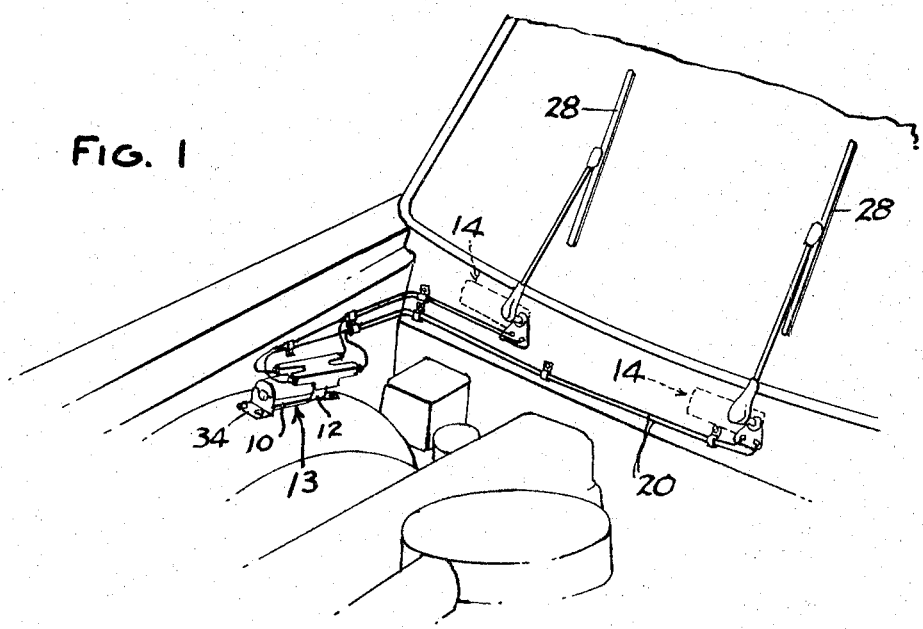
FIG. 1 is a perspective view showing a construction embodying the present invention installed in a passenger automobile.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

For purposes of description, a construction embodying the present invention is shown driving two windshield wipers, which is the number normally found on a passenger automobile or truck. However, many other embodiments of the present invention are possible. For example, it may be desired to drive only one windshield wiper, in which case a construction only having one slave cylinder and one drive cylinder is possible. If desired, the present invention may be adapted to drive three windshield wipers, such as found on some sports cars, simply by adding additional hydraulic cylinders and suitable connections. Practically any practicable number of windshield wipers may be used, if desired.

Also, it is to be understood that the present invention is not limited to use on passenger automobiles or trucks but may be used in any type application requiring windshield wipers, such as trains, boats, planes, etc.

For purposes of clarity and ease of description, the assembly comprising the electric motor 10, the crank-and-slider mechanism 11, the reduction gear 12, and the drive cylinders 15a, 15b, 15c and 15d, shall be called the drive cylinder assembly and generally designated by the numeral 13. Similarly, each assembly containing a pair of slave cylinders such as 21a, 21c, and the related mechanism to drive the windshield wipers will be called a slave cylinder assembly throughout the specification.

Figure 2:
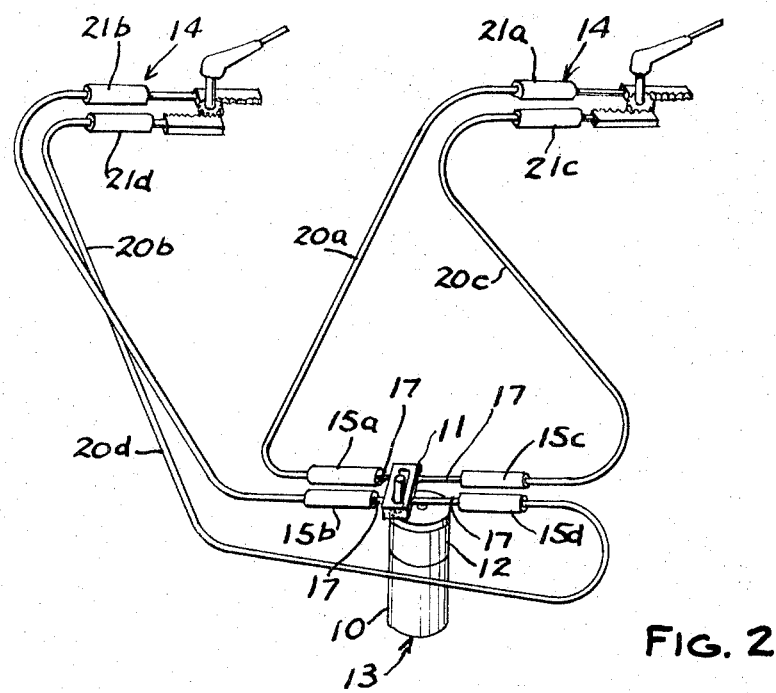
FIG. 2 is a schematic view of the construction embodying the present invention showing the power source, drive cylinders, and the slave cylinders which drive the wiper blades.
Figure 3:
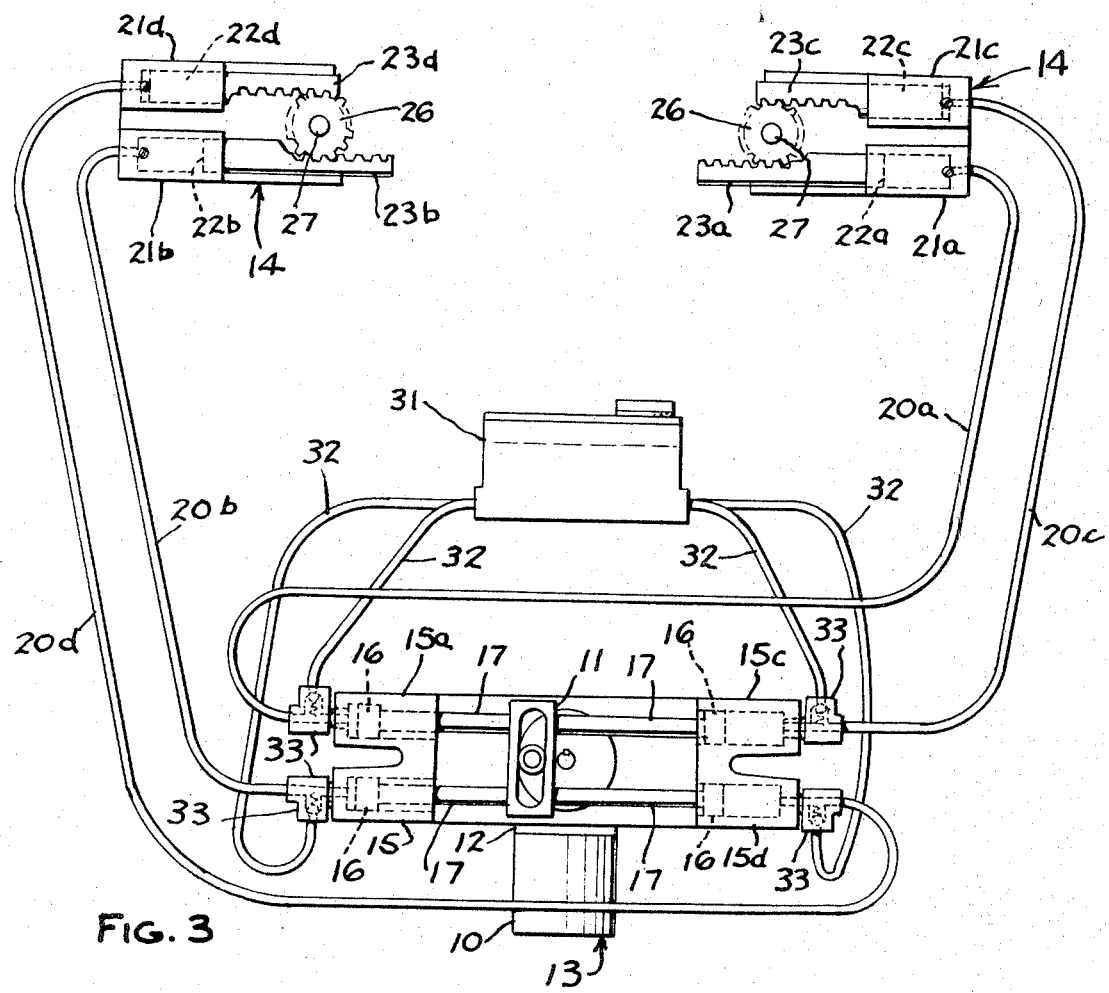
FIG. 3 is a schematic view similar in part to FIG. 2, but shown on a larger scale and showing a fluid reservoir connected to the system and adapted to replace any fluid which may leak out.

Referring specifically to FIGS. 1–3, the windshield wiper mechanism embodying the present invention comprises generally a drive cylinder assembly designated by the numeral 13 and two slave cylinder assemblies generally designated by the numeral 14. The drive cylinder assembly 13 comprises an electric motor 10 driving a crank-and-slider mechanism 11 through a suitable reduction gear 12. Connected to the crank-and-slider mechanism are four hydraulic drive cylinders 15a, 15b, 15c and 15d, each including a piston 16, see FIG. 3, connected through a piston rod 17, to the crank-and slider mechanism 11. It is to be understood that throughout this description, the cylinders being driven by the crank-and-slider mechanism will be referred to as "drive cylinders" and the hydraulic cylinders which, in turn, are activated by hydraulic fluid being expelled from the drive cylinders, i.e. the ones operating the windshield wiper arm assembly, will be called "slave cylinders" for purposes of clarity.

The positioning of each of the hydraulic drive cylinders 15a, 15b, 15c and 15d, in respect to the crank-and-slider mechanism 11 and the length of its respective piston rod is chosen in such a manner that when the hydraulic fluid is substantially expelled from one pair of the hydraulic drive cylinders 15a and 15b, the other pair of said cylinders 15c and 15d is substantially full of hydraulic fluid.

Each of the hydraulic drive cylinders 15a, 15b, 15c and 15d is connected by means of a suitable hydraulic conduit 20a, 20b, 20c and 20d, respectively, to its respective slave cylinder 21a, 21b, 21c and 21d, respectively.

Each of the slave cylinders 21a, 21b, 21c and 21d contain a piston 22a, 22b, 22c and 22d, respectively, slidably fitted therein with a rack 23a, 23b, 23c and 23d integrally formed on one end thereof. Each pair of racks 23b and 23d or 23a and 23c drives a gear 26 attached to the windshield wiper pivot shaft 27 and thereby driving the windshield wiper 28.

Since a pair of drive cylinders is required to drive each windshield wiper 28, the reciprocal motion of the windshield wiper 28 is accomplished by connecting a pair of slave cylinders, such as 21d and 21b, to hydraulic drive cylinders 15d and 15b, respectively, on opposite sides of the crank-and-slider mechanism 11. The forcing of fluid from the drive cylinder 15b will result in fluid being forced through the hydraulic conduit 20b into the respective slave cylinder 21b, resulting in the outward movement of the rack 23b because of the movement of the piston 22b. At the same time this is happening, the other drive cylinder 15d will be trying to draw in hydraulic fluid.

By virtue of the arrangement of the connections of the hydraulic conduits, this fluid will be drawn in from the other slave cylinder 21d of the required pair. In fact, the fluid from this slave cylinder 21d will actually be forced into the drive cylinder 15d. The gear 26 being driven by the rack 23b will, in turn, force rack 23d inward and, therefore, the piston 22d into the slave cylinder 21d, thereby expelling hydraulic fluid therefrom through the conduit 20d and into the drive cylinder 15d. When the crank-and-slider mechanism 11 starts its return stroke, the reverse sequence of events will occur causing the gear 26 to rotate in the opposite direction. The repetition of this series of events causes the reciprocal operation of the windshield wipers. A similar sequence of events taking place in the other pair of slave cylinders 21a and 21c will result in the reciprocal operation of the other windshield wiper. Such operation will be synchronous with the first wiper because of the arrangement of the drive cylinders.

It is seen that by this sequence of connections, the hydraulic fluid in the conduits 20 actually becomes a hydraulic link between the drive motor 10 and the windshield wiper 28 to replace the mechanical linkage previously used in the art.

To replace any hydraulic fluid which may leak out of either the drive cylinders 15 or the slave cylinders 21, a suitable fluid reservoir 31 may be provided and connected by means of suitable hydraulic lines 32 and check valves 33 to the system at a position above the drive cylinders 15.

Figure 4:
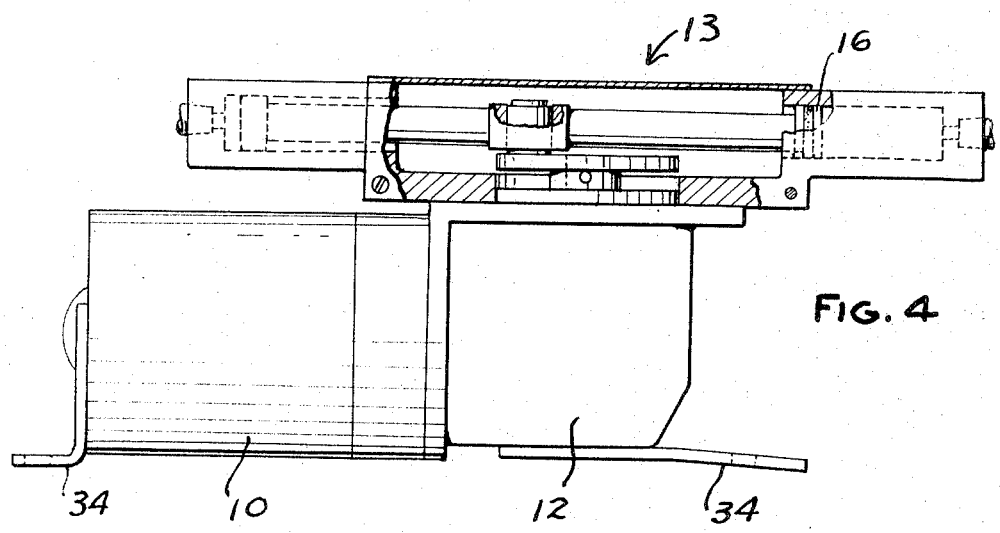
FIG. 4 is an elevational view, partly cut away, of a power source and drive cylinder assembly used in the present invention.

Referring specifically to FIG. 4, this figure shows an embodiment of the drive cylinder assembly portion 13 of the present invention ready for mounting in a passenger automobile. Suitable mounting brackets 34 are provided on the motor 10 and the reduction gear 12 for attaching this portion of the mechanism to the body of the automobile. It can be seen that since no mechanical linkage is necessary in the present invention, this portion of the mechanism may be mounted practically anywhere in the automobile. A convenient place as shown in FIG. 1 is on the fender well of the automobile. However, this drive mechanism may even be mounted in the trunk if no other space is available. This important advantage of my invention allows much greater design freedom than was ever possible before when the drive motor and reduction gear were more or less confined to a position in the center of the cowl area of the engine compartment.

Figure 5:
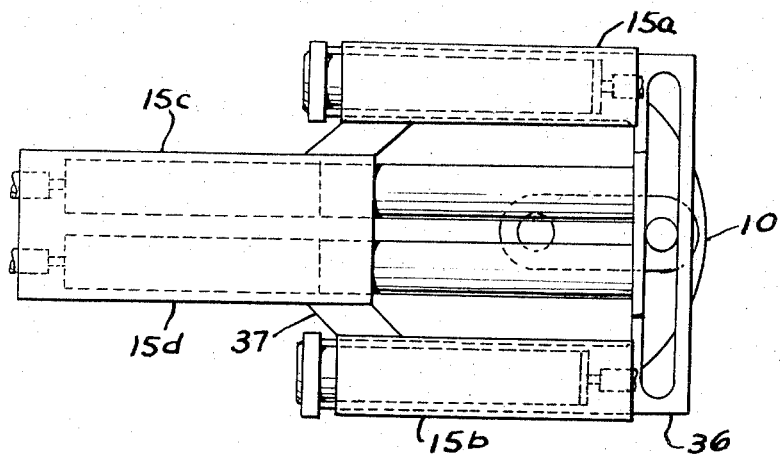
FIG. 5 is a plan view of a modification of the power source and drive cylinder assembly.
Figure 6:
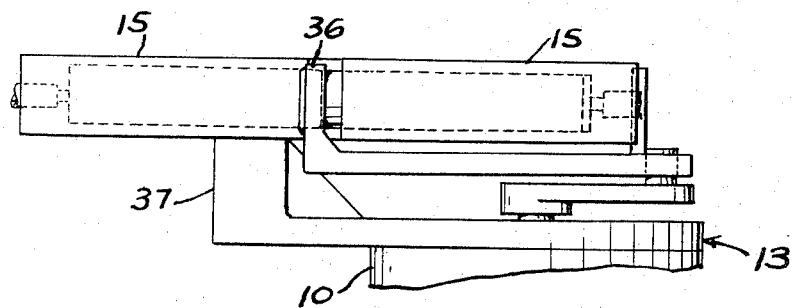
FIG. 6 is a partial elevational view of FIG. 5.

Several modifications of the drive cylinder assembly 13 are possible, depending on size requirements and other factors. One such modification is shown in FIGS. 5 and 6 wherein all the drive cylinders 15a, 15b, 15c and 15d are disposed to one side of the electric motor 10 with nothing protruding past the other side of said electric motor. This is accomplished by providing a C-shaped slider bar 36 which is connected to all the drive cylinders 15a, 15b, 15c and 15d. Said drive cylinders 15a, 15b, 15c and 15d are held in place by a suitable supporting member 37.

Figure 7:
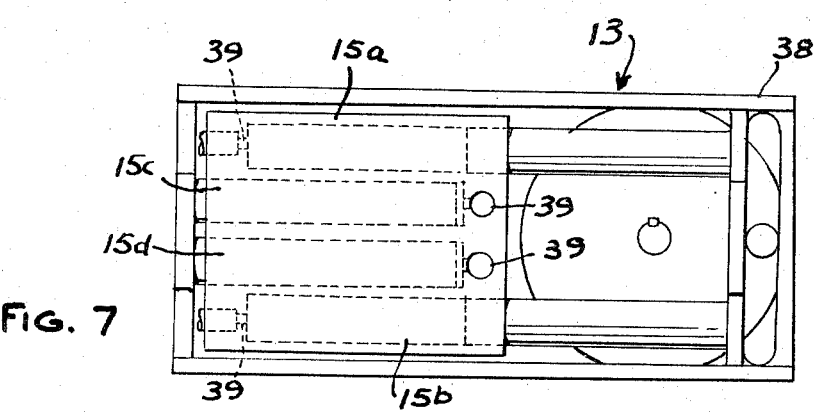
FIG. 7 is a plan view of still another modification of the power source and drive cylinder assembly.

A still further modification of the drive cylinder assembly 13 is shown in FIG. 7, which is similar in part to the one shown in FIG. 5 in that all the drive cylinders are mounted to one side of the motor 10, but in addition one pair of the drive cylinders 15a, 15b is mounted in such a manner as to be facing in the opposite direction of the other pair of drive cylinders 15c, 15d, all of said driving cylinders being connected in a suitable manner to a rectangularly shaped slider bar 38. Suitable ports 39 for the passage of hydraulic fluid are provided in the ends of all the drive cylinders 15a, 15b, 15c and 15d.

Figure 8:
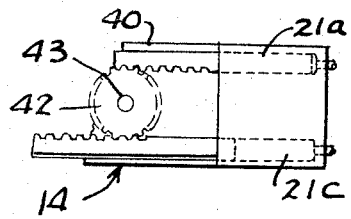
FIG. 8 is a plan view showing one arrangement of the slave cylinders and their use for driving the windshield wiper.
Figure 9:
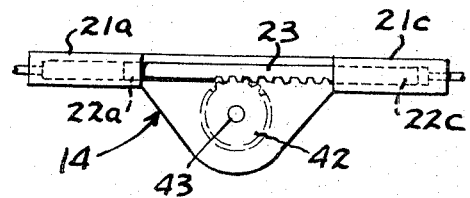
FIG. 9 shows a modification of the arrangement of the slave cylinders used for driving the windshield wiper.

Another important advantage of the present invention in addition to providing many possibilities for the design and placement of the drive cylinder assembly 13 is the great variety of arrangements available for the slave cylinder assembly 14 which actually drives the windshield wiper. One such embodiment of the slave cylinders 21, see FIG. 8, shows a pair of said cylinders 21a and 21c mounted one above the other on a suitable supporting member 40. Thus, they are arranged in such a manner as to drive a gear 42 drivingly fastened to the windshield wiper pivot shaft 43, which is attached to and actually drives the windshield wiper. This arrangement has many advantages in today's automobile where the windshield wiper blades are arranged so as to operate in a parallel fashion. This parallel manner of operation depending on the particular arrangement results in there being a very limited space on either the right or lefthand side of the car for the positioning of the windshield wiper drive mechanism. This arrangement with both slave cylinders 21a and 21c being on one side of the windshield wiper pivot shaft 43 allows easy placement of the drive mechanism in this situation.

Where more room is available for the windshield wiper drive mechanism, such as in large automobiles or in other applications, such as boats, etc., the embodiment of the slave cylinder assembly shown in FIG. 9 is convenient. As shown in said figure, the slave cylinders 21a and 21c are arranged on each side of the pivot shaft 43. The pistons 22a and 22c for both slave cylinders 21a and 21c are formed on the ends of one elongated shaft having a rack 23 as an integral part thereof. This rack drives the gear 42 and thereby operates the windshield wiper.

Figure 10:
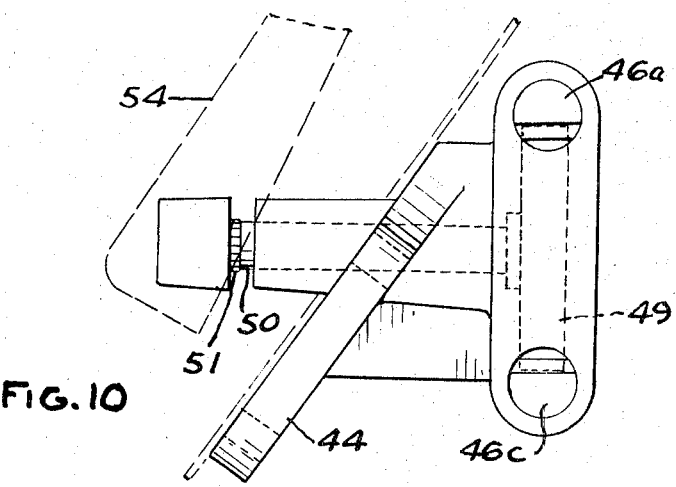
FIG. 10 is an elevational view showing an embodiment of the slave cylinders in a windshield wiper pivot assembly ready to be mounted in an automobile.
Figure 11:
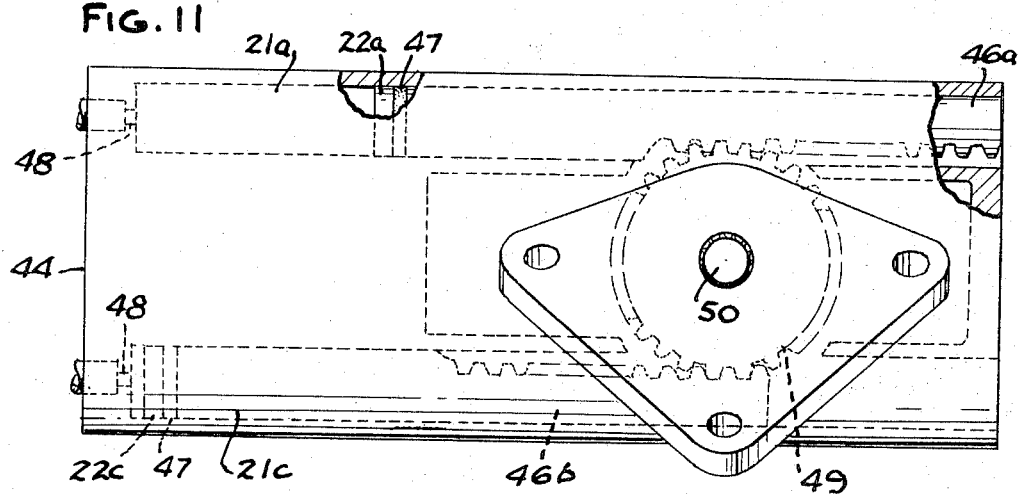
FIG. 11 is a plan view of the assembly of FIG. 10.

An embodiment of the slave cylinder arrangement shown in FIG. 8 ready for mounting is shown in FIGS. 10 and 11. The slave cylinders 21a and 21c are integrally formed in a suitable supporting and mounting member 44 and have pistons 22a and 22c slidably fitted therein. Each of said pistons 22a and 22c have a rack 46a and 46c formed on one end thereof. Suitable seals 47 are provided on the pistons 22a and 22c to prevent any loss of hydraulic fluid. Suitable ports 48 are provided at the end of the cylinders 21a and 21c for passage of the hydraulic fluid. An enlarged portion 49 of each port is provided for connection of hydraulic conduit thereto. The racks 46a and 46c drive the gear 49 which is connected to the windshield wiper pivot shaft 50. The pivot shaft 50 has a spline portion 51 suitable for receiving the swinging arm 54.

Figure 12:
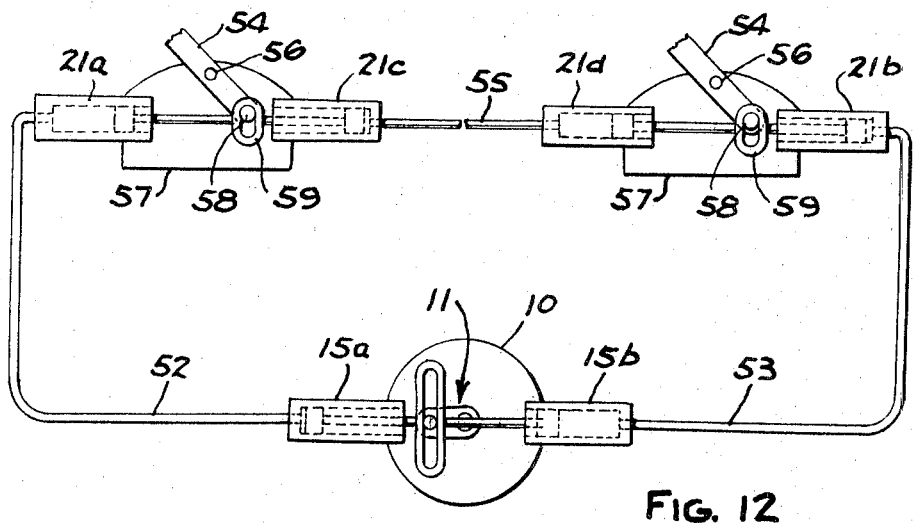
FIG. 12 is a modification of the present system whereby only a single pair of drive cylinders is required to drive two windshield wipers instead of the two pairs required in other embodiments of the present invention.

FIG. 12 shows a modification of the present invention requiring only one pair of hydraulic drive cylinders, such as 15a and 15b, to drive two windshield wipers. This is achieved by the method of connecting the slave cylinders 21a and 21b to the drive cylinders 15a and 15b. In this embodiment, one slave cylinder of each pair, such as 21c and 21d are connected together by a suitable hydraulic conduit 55. The other pair of slave cylinders, such as 21a and 21b, are each connected to their respective drive cylinders 15a or 15b by suitable hydraulic conduits 52 and 53.

In this arrangement, a type of crank-and-slider mechanism is used to drive the swinging arm of the windshield wiper mechanism. The swinging arm 54 rotates about a pivot 56 mounted on a supporting member 57. At the lower end of the swinging arm 54, a post 58 is provided which operatively engages the slider bar 59. When the slider bar 59 is reciprocally driven by the slave cylinders 21, the swinging arm 54 rotates about the pivot 56, thereby driving the windshield wipers in their familiar semi-circular path. In this arrangement, the electric motor 10 and the crank-and-slider mechanism 11 are essentially identical to the ones used in other embodiments. This arrangement wherein only two drive cylinders 15a and 15b are required is suitable for the situation wherein a greater amount of space is available where the slave cylinder driving mechanism for the windshield wiper is to be mounted but where space for the driving cylinder mechanism may be limited. Also, the cost of the mechanism in this embodiment may be somewhat reduced by the elimination of two of the hydraulic drive cylinders.

As can be seen from the foregoing description, a hydraulic windshield wiper actuating mechanism is provided which eliminates the design limitations and noise problems encountered with the old mechanical windshield wiper systems. The old system required a great deal of space for the mechanical linkage in the cowl area, thereby limiting many design factors of the automobile, such as how low the profile of the automobile could be, the shape of the cowl chamber, and the position of the drive motor. Also, the old mechanical system was noisy and transmitted this noise by means of its mechanical linkage to the interior of the vehicle.

In contrast, my invention provides a drive mechanism which is small and compact and which can be placed anywhere in the car and provides a hydraulic link in place of the former mechanical link, which hydraulic link is by nature silent and which eliminates or greatly reduces the problems present with the old mechanical linkage system.

It should be understood that in the operation of the present system some difficulty may be experienced because of air entrapment within the hydraulic lines. This problem may be easily eliminated in several ways, such as by providing small air bleeder valves at each drive and slave cylinder.

By virtue of the above-described construction, the objects of the invention listed above and numerous additional advantages are attained.

I claim:

1. In a hydraulic windshield wiper actuating mechanism, a source of power, at least one pair of opposed hydraulically non-interconnected hydraulic drive cylinders of identical volume, a shaft connected to said source and interconnecting said drive cylinders, reciprocating drive means connected to said shaft, at least one pair of opposed hydraulically non-interconnected hydraulic slave cylinders of identical volume to said drive cylinders, a shaft connecting said slave cylinders, each of said slave cylinders connected by a hydraulic line to a drive cylinder, said pair of slave cylinders adapted to reciprocally drive a pivotally mounted windshield wiper assembly.

2. The device defined in claim 1, and having two pairs of hydraulically non-interconnected hydraulic slave cylinders of identical volume to said drive cylinders, two shafts interconnecting each pair of said cylinders respectively, and each carrying a wiper blade, each of said slave cylinders connected by a single hydraulic line to a respective drive cylinder, and each pair of said slave cylinders adapted to drive one of said wiper assemblies.

3. The device defined in claim 1, and including a fluid reservoir connected through check valves to said hydraulic lines above said drive cylinders, and adapted to supplement in the system any fluid which may leak out.

4. The device defined in claim 2, and having two pairs of opposed hydraulic drive cylinders, both of identical size, and a single hydraulic line for each of said drive cylinders connected to its respective slave cylinder for operating the same, and a source of power operating said drive cylinders.

5. The device defined in claim 3, wherein the source of power comprises an electric motor with a crank and slider mechanism attached thereto.

6. A windshield wiper mechanism comprising two wiping blades, two pivotally mounted reciprocally swinging arms each carrying one of said blades, two pairs of hydraulic slave cylinders of identical volume and not hydraulically interconnected, a mechanical connection between each swinging arm and its respective pair of slave cylinders to actuate it in two directions, a source of power, two pairs of driving hydraulic cylinders of identical volume to said slave cylinders drivingly connected to said source of power to be actuated in two directions, and each of said drive cylinders being connected to its respective slave cylinder by a single hydraulic conduit to reciprocally operate said slave cylinders and said swinging arms.

7. The device defined in claim 6, wherein said mechanical connection is in the form of a simple crank and slider mechanism.

8. The device defined in claim 6, wherein said mechanical connection is in the form of a rack operatively interposed between, each pair of slave cylinders and driving a gear-mounted on the swinging arm pivot.

9. The device defined in claim 6, wherein said mechanical connection is in the form of a gear mounted on each swinging arm and interposed between a pair of racks operatively mounted on each pair of said slave cylinders.

10. The device defined in claim 6, and including a fluid reservoir connected by check valves to said hydraulic lines above said drive cylinders, and adapted to supplement in the system any fluid which may leak out.

11. The device defined in claim 6, wherein the source of power comprises an electric motor with a crank and slider mechanism attached thereto.

12. The device defined in claim 11, wherein said pairs of driving cylinders are connected to said crank and slider mechanism in such a manner that when one pair of said cylinders is substantially evacuated the other pair is substantially filled with hydraulic fluid.

* * * * *